Jan. 13, 1970   H. J. MORTUS   3,489,195
SELF-LOCKING FASTENER
Filed Jan. 18, 1968   4 Sheets-Sheet 1

INVENTOR.
HAROLD JAMES MORTUS
BY Watts, Hoffmann,
Fisher & Heinke
ATTORNEYS.

Jan. 13, 1970   H. J. MORTUS   3,489,195
SELF-LOCKING FASTENER

Filed Jan. 18, 1968   4 Sheets-Sheet 3

INVENTOR.
HAROLD JAMES MORTUS
BY *Watts, Hoffmann,
Fisher & Heinke*
ATTORNEYS

Jan. 13, 1970  H. J. MORTUS  3,489,195
SELF-LOCKING FASTENER

Filed Jan. 18, 1968  4 Sheets-Sheet 4

INVENTOR.
HAROLD. JAMES MORTUS
BY *Watts, Hoffmann Fisher & Heinke*
ATTORNEYS.

United States Patent Office 3,489,195
Patented Jan. 13, 1970

3,489,195
SELF-LOCKING FASTENER
Harold James Mortus, Twinsburg, Ohio, assignor to The National Screw & Manufacturing Company, Cleveland, Ohio, a corporation of Ohio
Filed Jan. 18, 1968, Ser. No. 698,861
Int. Cl. F16b 39/282
U.S. Cl. 151—22                          3 Claims

ABSTRACT OF THE DISCLOSURE

An externally threaded self-locking fastener usable with an ordinary internally threaded member, the fastener having a circumferential groove die rolled therein intermediate the ends of the thread and preferably no deeper than the thread depth, forming circumferential abutments that interfere with the thread of the mating member.

The present invention relates to threaded fasteners and more particularly to externally threaded fasteners having distorted thread portions that produce an interference when used with a member having an internal thread adapted to cooperate with the external thread with a noninterference fit, that is, a clearance or transition fit as defined in Screw-Thread Standards for Federal Services, 1957, Handbook H28, National Bureau of Standards.

One of the principal objects of the invention is the provision of a novel, reliable, self-locking, externally threaded fastener usable with an ordinary internally threaded member and which will engage therewith and produce an interference that provides a locking function.

Another object of the invention is the provision of a novel and improved fastener that provides "solid state" locking, i.e., that is an integral unit which performs a locking function without secondary parts and which is therefore basic in construction and inexpensive to manufacture.

Another object of the invention is the provision of a novel and improved fastener of the character referred to in which a limited axial portion of the fastener intermediate the ends of the thread is provided with a circumferential rolled groove that produces an interference when the fastener is used with a mating member having an internal thread that otherwise cooperates with the threaded fastener to form a noninterference fit.

Another object of the invention is the provision of a novel and improved fastener of the character referred to in which the groove that produces the interference fit extends about the shank preferably at zero lead angle or a lead angle smaller than the lead angle of the thread, is preferably of a depth no greater than the depth of the thread, and has surfaces which diverge outwardly of the screw thread axis producing circumferential deformations at each axial end of the groove which act in opposite axial directions against the thread of a mating member to provide a double interference action.

Another object of the invention is the provision of a novel and improved fastener of the character referred to in which the groove that produces the interference action as described above can be formed initially during a thread forming operation or can be formed in already threaded fasteners.

Another object of the invention is the provision of a novel and improved fastener of the character referred to in which the torque required to screw the fastener and a mating part together can be varied by varying the dimensions of the rolled groove, especially the depth of the groove.

A further object of the invention is the provision of a novel and improved fastener of the character referred to in which a uniform decline of interference and accompanying torque necessary to screw together the fastener and a mating part is obtained through at least five re-uses of the mating parts (i.e., assembly and disassembly) during which the fastener must be tool driven in both directions.

The invention resides in certain configurations and structural relationships and in certain methods of manufacture referred to in connection with the following description of preferred embodiments described with reference to the accompanying drawings forming a part of this specification, in which similar reference characters designate corresponding parts, and in which.

Figure 5:
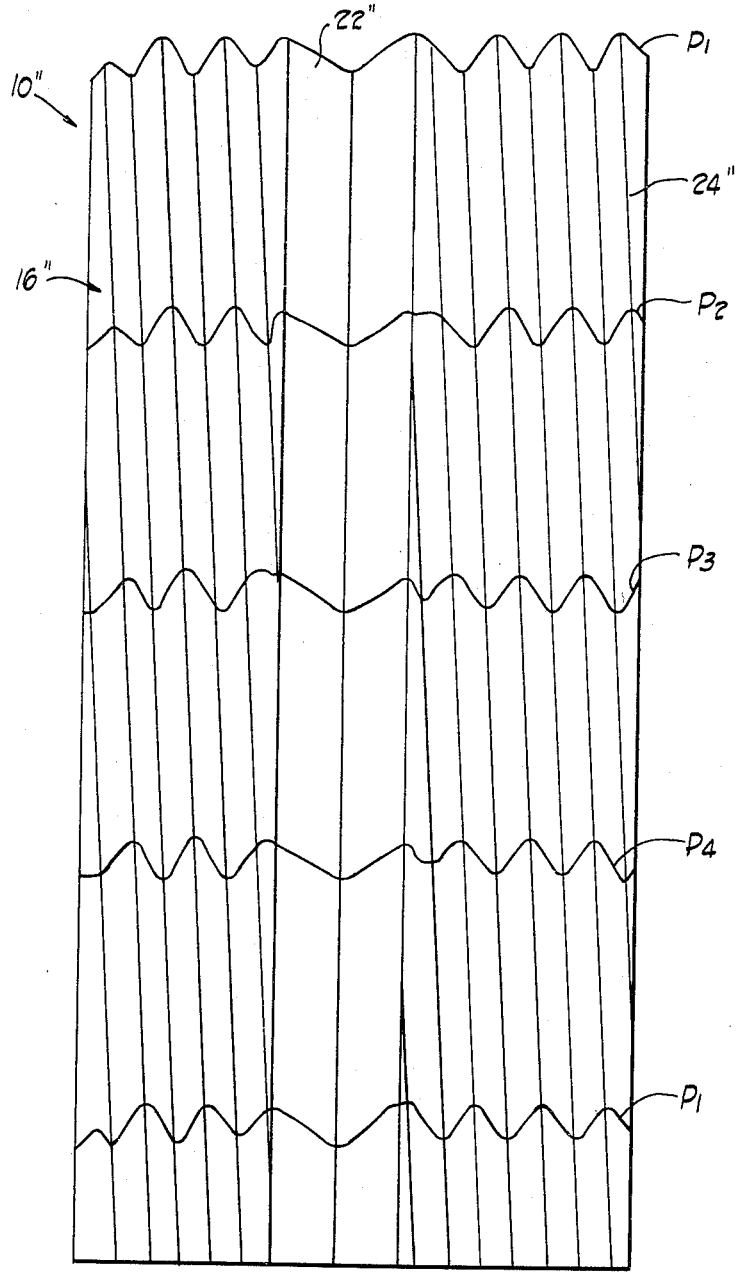
Figure 6:
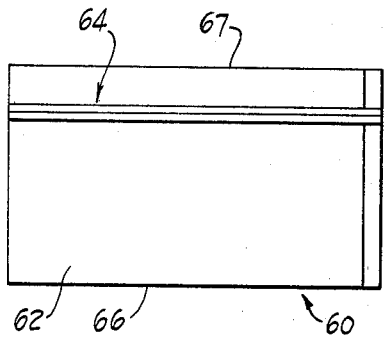
Figure 7:
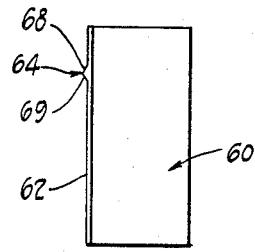
Figure 8:
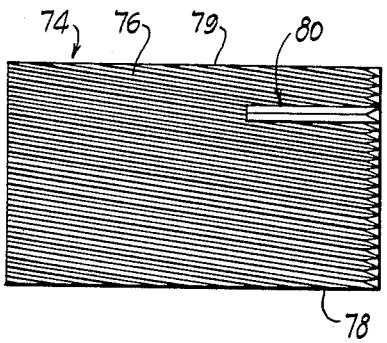
Figure 9:
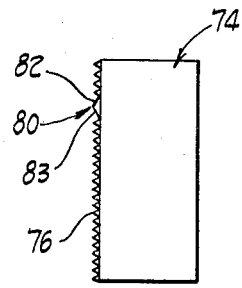

FIGURE 5 is a series of four reproduced outlines of an externally threaded shank of a fastener having a rolled groove for producing interference with a mating part, which outlines were originally produced by a profilometer at 90° intervals of rotation of the fastener about the axis of the shank and which have been diagrammatically connected to show a superimposed view of a portion of the thread and the groove;

FIGURE 6 is a front elevational view of a roller die for use in rolling a groove in threaded shanks;

FIGURE 7 is a side elevational view of the die of FIGURE 6;

FIGURE 8 is a front elevational view of a die for rolling a thread and groove on a fastener blank; and FIGURE 9 is an end elevational view of the die of FIGURE 8.

Figure 1:
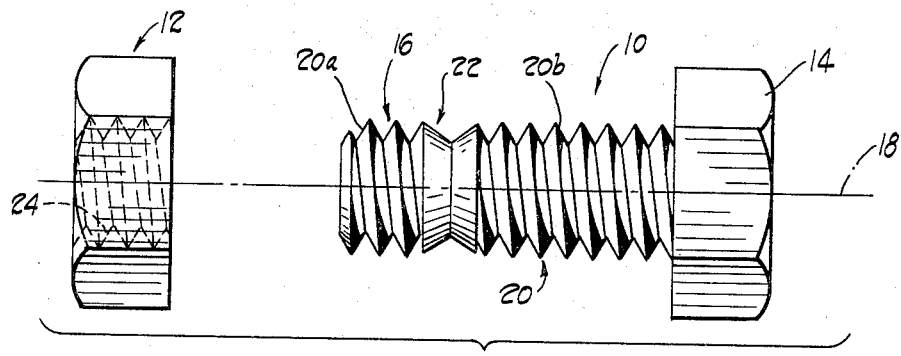
FIGURE 1 is a side elevational view of an externally threaded fastener embodying the present invention and a nut of conventional construction for use with the fastener.

Referring to the drawings, FIGURE 1 shows a threaded fastener in the form of a hexagon head screw 10 that embodies the present invention, and a conventional nut 12 representative of an internally threaded member suitable for use with the screw 10. The screw 10 comprises an integral hex-head 14 and shank 16. The head 14 and shank 16 have a common central axis indicated by the imaginary line 18. The shank 16 of the screw 10 has an external screw thread 20 interrupted by an annular groove 22, which divides the thread 20 into two portions 20a, 20b. The groove, which is rolled into the thread 20, forms a thread distortion which produces an interference with a mating thread and hence provides a locking function. The groove 22 can be formed in the fastener at the time the thread is formed or can be subsequently formed in a completely threaded fastener and is located at a position along the shank 16 suitable for the particular application to which the fastener is to be put. That is, the groove is located so that the thread of the part with which the screw is used will extend across or overlie the groove. The thread portion 20a should include at least two thread turns to facilitate entry of the thread of the screw into the mating thread and the driving of the mating thread across the groove. The thread 20, as shown, is a Unified thread form of one-fourth inch nominal size, 20 threads per inch, class 2A allowance and tolerance, as defined in Handbook H28 (1957).

The nut 12 has an internal thread 24, which thread, in the embodiment shown, is a Unified class 2B thread as defined in Handbook H28 (1957). The thread 24 of the nut 12 provides an actual clearance fit with unaltered portions of the thread 20 of the screw 10 when the screw and nut are assembled.

Figure 2:
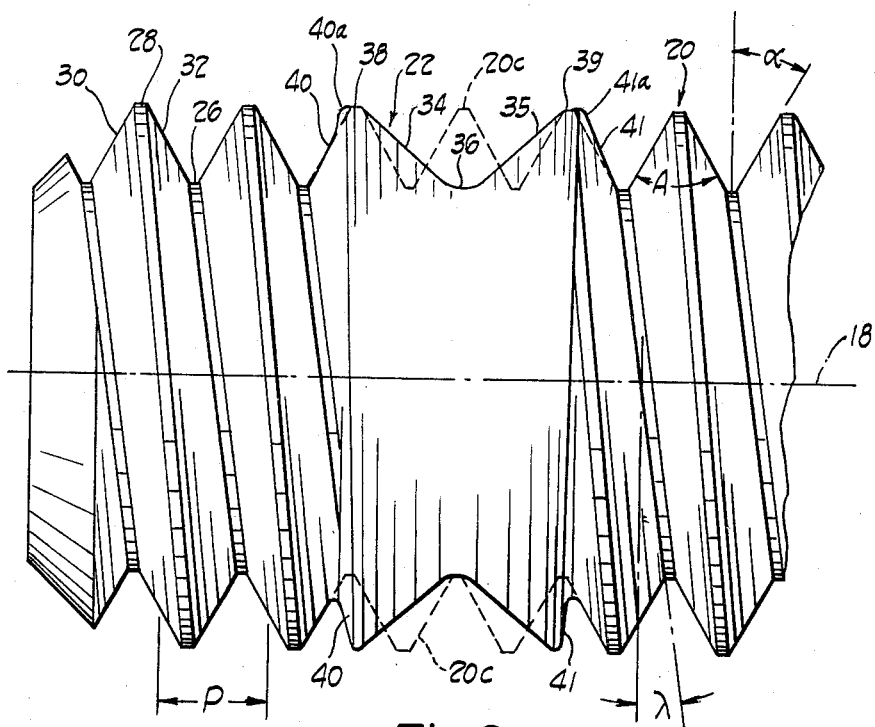
FIGURE 2 is a partial side elevational view on an enlarged scale of a shank portion of the fastener of FIGURE 1, illustrating the contour of the rolled groove that produces the interference and also adjacent threaded portions of the shank.

A portion of the thread 20 is shown on an enlarged scale in FIGURE 2 of the drawings. As indicated in FIGURE 2, the thread 20 is a single thread and has a root 26, a crest 28, a leading flank 30, a trailing flank 32, a thread angle A (i.e., an included angle between the leading and trailing flanks), which is equal to 60° in a standard thread such as the Unified thread shown, a flank angle or half-angle of thread $\alpha$, which is 30° in a standard thread such as the Unified thread shown, a lead angle $\lambda$, and a pitch $p$, equal to the lead of the thread, which is the distance the threaded part moves axially with respect to a fixed mating part in one complete rotation. As used herein, the term "standard thread" is meant to designate a commercial thread such as Unified, American Standard or American National threads and threads of essentially the same form.

The groove 22 of a preferred embodiment, as best shown in FIGURE 2, is formed of two generally conical surfaces 34, 35 that diverge outwardly from the center 36 of the groove, which center 36 is located at the same radial depth in the shank as the root 26 of the thread 20. As shown, the center 36 of the groove lies in a plane at right angles to the axis 18 of the shank. Thus, the groove has a lead angle of zero. The conical surfaces 34, 35 terminate in generally circular outer edges 38, 39 located essentially the same radial distance from the shank axis 18 as the crest 28 of the thread 20. The circular edges 38, 39 generally lie in planes that are substantially at right angles to the shank axis or that are inclined just slightly toward each other, and the conical surfaces 34, 35 may include irregularities due to the manner in which the groove 22 is formed. At opposite ends of the groove flank-like circumferential surfaces 40, 41, which are deformed thread portions produced when the groove 22 is rolled, form circumferential abutments that act in opposite axial directions against the threads of a mating part to provide a double interference action. These surfaces 40, 41 typically extend at a smaller and non-uniform angle than the half angle $\alpha$ of the thread relative to a reference plane perpendicular to the axis of the shank, and desirably have slightly flared outer portions 40a, 41a adjacent the circular edges 38, 39. The surfaces 40, 41 include flank portions of the thread distorted into a generally circular or annular contour and thus portions of the surfaces may include a lead angle from an original flank but the general extent of each surface considered as a whole is annular and therefore has a lead angle of zero.

An imaginary portion of the thread 20 is indicated in phantom at 20c in FIGURE 2 to illustrate the original portion of the thread replaced by the groove 22. This illustrates that the width of a groove 22 of full depth is about equal to twice the lead and pitch of the thread 20. The included angle between the conical surfaces 34, 35 is about 120°. This size of the included angle, while not critical, has been found to most effectively produce abutment surfaces 40, 41 of proper size, shape and location when the groove is rolled in a manner to be described subsequently.

Figure 3:
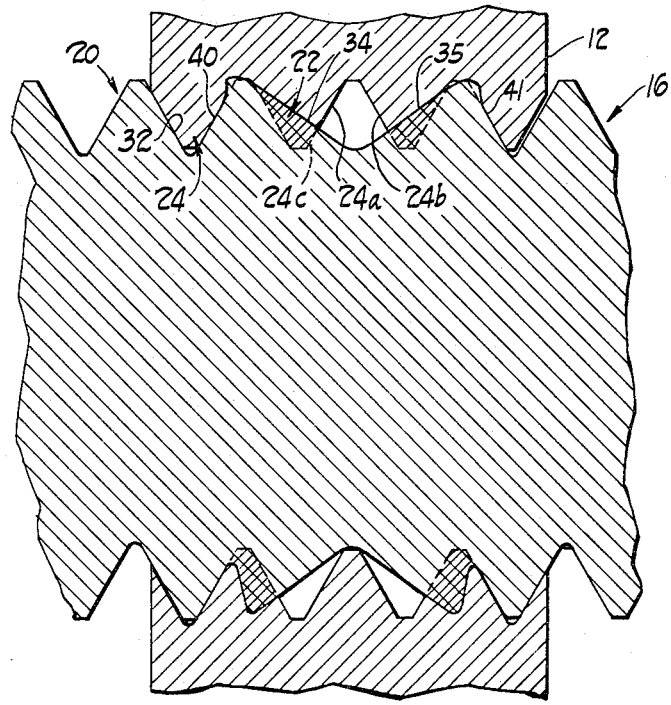
FIGURE 3 is a sectional view of the shank portion of FIGURE 2 diagrammatically illustrating the interference fit created by the rolled groove with respect to a mating nut of conventional construction.

The manner in which the thread 20, as deformed by the groove 22 cooperates with a mating thread, such as the thread 24 of the nut 12, is illustrated in FIGURE 3 of the drawings. As shown, the nut 12 has been threaded onto the shank 16. The thread 24 of the nut 12 is shown in contact with the trailing, pressure flank 32 of the thread 20, illustrative of the condition existing when the nut and screw are assembled to compress a member or members between the head 14 of the screw 10 and the nut 12.

FIGURE 3 is diagrammatic in that the side portions of the groove 22 and the thread 24 of the nut 12 which interfere with each other are both shown in an original configuration existing prior to assembly, with interferring portions indicated by double cross-hatching. It will be apparent to those skilled in the art that the conical surfaces 34, 35 of the groove 22 and the abutment surfaces 40, 41 do not remain in the configuration shown in FIGURE 4 when the mating part 12 is positioned as shown. Rather, the side portions of the groove 22 that interfere with the thread 24 of the nut 12 are deformed to receive the thread 24 and are in part forced into the open areas between the turns of the thread 24 so as to engage both leading and following flanks 24a, 24b, respectively, of the thread 24. In particular, the end abutment surfaces 40, 41 are compressed inwardly toward the center of the groove by the mating part and therefore exert a force axially outwardly of the groove 22 in opposite directions against the thread of the mating part.

The interference between the thread 24 on the one hand and the end abutment surfaces 40, 41 and surface portions 34, 35 of the groove 22 on the other hand provides a locking function so that relative rotation between the nut 12 and the screw 10 can be obtained only if the two members are tool driven relative to each other. A double locking action is obtained as the mating thread 24 engages both the tension side abutment surface 40 and the compression side abutment surface 41 formed by the groove 22. This is achieved as the threaded shank 16 advances into the mating part 12 and the mating part progresses first over the abutment surface 40, across the groove 22, and then over the abutment surface 41 so that the mating part spans the groove 22.

The torque required to thread the two parts or members together across the groove can be varied by changing the configuration of the groove. For example, a shallower groove in which portions of the helical path between turns of the original thread remain will decrease the degree of interference with the mating thread. Also, a narrower groove, for example, a groove that is of a width only slightly greater than the lead of the external thread, or a groove that is helical but oriented at a different angle relative to the axis of the threaded shank than the threaded angle will produce substantially less interference and require a smaller amount of torque to provide relative rotation between the mating part than the groove of the preferred embodiment described. On the other hand, in standard commercial fasteners grooves appreciably deeper than the threads unnecessarily weaken the thread shank without provided any substantial advantage over grooves of a similar width formed to the depth of the thread.

Figure 4:
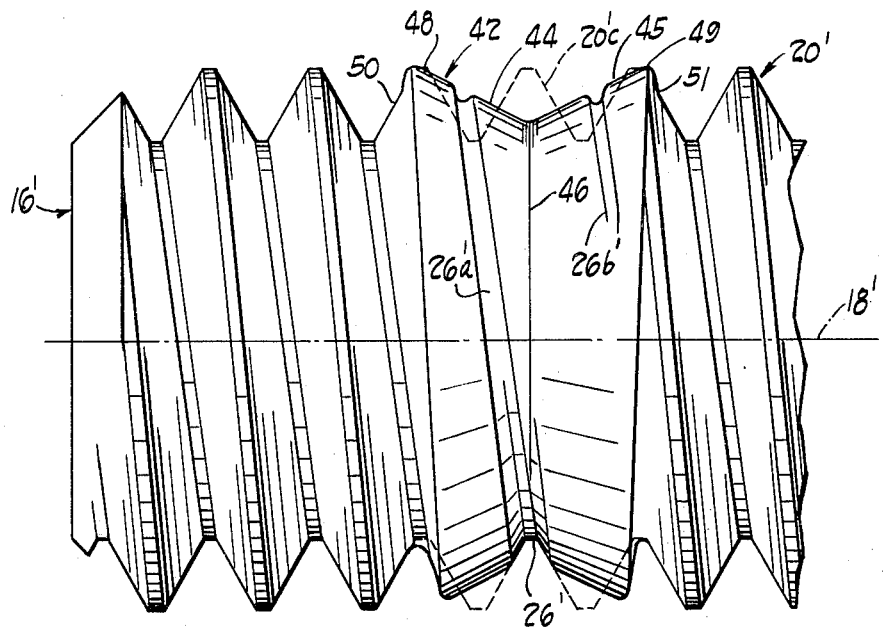
FIGURE 4 is a partial side elevational view similar to FIGURE 2, but illustrating an embodiment in which the rolled groove that produces interference is of lesser depth than the threads.

A fastener having a somewhat shallower groove than shown in FIGURE 2, but otherwise similar in all respects, is illustrated in FIGURE 4 of the drawings. Still shallower grooves will also be similar but may modify fewer turns and will provide less interference. As shown, those portions of the fastener of FIGURE 4 that are identical to corresponding parts of the fastener of FIGURES 1 to 3 are indicated by the same reference numeral, with a prime designation and such designated parts of identical construction will not be described in complete detail.

As shown in FIGURE 4, a shallow groove 42 is formed in a thread 20′ by deforming approximately three turns of the thread in a two-way direction axially of the shank to form the circular V-shaped groove 42. Because the depth of the groove 42 is less than the thread depth in the embodiment shown, root portions or remnants thereof of the original thread remain in the groove 42. The contour of the turns of the original thread 20′ as they existed in the area of the groove 42 prior to being deformed is partially indicated in phantom at 20c′.

The groove 42 includes two generally conical outwardly diverging surfaces 44, 45 having a center portion 46 in a plane at right angles to the shank axis 18' and two spaced outer edges 48, 49. The outer edges 48, 49 are substantially circular and lie in planes that extend transversely of the axis 18' of the shank 16' and which are substantially at right angles to the shank axis or inclined slightly toward each other due to the initial thread configuration. As shown, the groove 42 is closed and therefore has no lead angle. Flank-like circumferential surface portions 50, 51 at opposite ends of the groove 42 form circumferential abutments that act against the thread of a mating part as explained in connection with the abutment surfaces 40, 41 of the groove 22. However, because this groove 42 is not as deep as the groove 22, the abutment surfaces 50, 51 are not as steeply inclined or axially displaced as far from the original thread portions in the area of the groove as are the surfaces 40, 41, and therefore do not produce as great a degree of interference.

Also, because the groove 42 is not as deep as the thread 20', a portion of the original thread root 26' exists at the center 46 of the groove along a short peripheral portion of the groove 42 as shown at the lower portion of FIGURE 4. A remnant of the root 26' also exists in a helical path across the surfaces 44, 45, as indicated at 26a', 26b' at the upper portion of FIGURE 4, because thread portions deformed to form the surfaces of the groove 42 have not completely filled the space between the original thread turns.

FIGURE 5 is a drawing of actual profilometer tracings of a standard ¼ inch nominal diameter, 20 threads per inch, screw fastener 10'' having a shank 16'' and a groove 22'' formed in the shank. Four different profiles P1, P2, P3, P4 of the threaded shank are shown, each taken in an axial plane 90° displaced from the next about the circumference of the shank, with the first profile P1 being repeated. The thread portions 24'' existing between the profiles have been diagrammatically included to illustrate a development of the thread and rolled groove about the circumference of the shank.

Dies suitable for forming fasteners embodying the present invention are shown in FIGURES 6 to 9 of the drawings. Rotary as well as reciprocable dies can be used. The reciprocable roller die of FIGURES 6 and 7 is constructed and intended for use on threaded stock fasteners. As shown, a rectangular die plate 60 is provided with a smooth flat face 62 with a blade 64 extending longitudinally across the face 62 parallel to the direction in which the die is moved in a rolling operation. The blade projects outwardly from the die face and is located at a position between upper and lower longitudinal edges 66, 67 to produce the groove 22 on a threaded fastener at the desired location along the axial length of the shank of the fastener. If it is desired to form a groove with a lead angle greater than zero but smaller than the lead angle of the thread, the blade 64 is oriented at an angle between its present direction of extent parallel to the die movement and the angle at which the screw thread turns extend across the die face. As best shown in FIGURE 7, the projecting blade 64 is V-shaped in cross sectional contour, having two flat surfaces 68, 69 converging outwardly of the face 62. Consistent with the contour desired in the groove to be formed on the fastener, the width of the projecting blade may be equal to about twice the lead of the thread of the fastener being modified, the depth of the blade 64 is approximately equal to the thread depth, and the angle between the flat surfaces 68, 69 is approximately 120°. A second die (not shown) compatible with the die 60 is used in conjunction with the die 60 in the conventional manner. When a threaded fastener is placed between the faces of two such dies and the dies are reciprocated relative to each other to roll the fastener between the dies in the conventional manner in which threads are rolled, the blade 64 deforms the threads of the fastener in a two-way axial direction to form a groove and circumferential abutments about the shank in the form already described.

The die shown in FIGURES 8 and 9 is suitable for rolling a complete threaded fastener from a headed blank, simultaneously forming a groove of the shape described at a desired axial location. The die is formed of a rectangular die plate 74 with forming threads 76 forming a working surface. As shown, the threads 76 are inclined relative to longitudinal edges 78, 79 of the die plate 74. An elongated blade 80 projects from the working surface of the die in which the forming threads 76 are provided, extends parallel to top and bottom edges 78, 79 part-way along the die plate adjacent the finishing end of the die so that a groove is rolled after threads are formed. The blade 80 replaces the forming threads 76 where the blade is located. The width of the blade 80 shown in FIGURES 8 and 9 corresponds substantially to twice the lead of the threads to be formed on the fastener, extends from the die a distance equal to the depth of the forming threads 76 or a smaller distance if the shallower groove is desired, and is formed of two angularly related flat surfaces 82, 83 having an included angle of approximately 120° between them so as to form in the fastener a groove having the contour of the groove 22 or 42 already described. A second die (not shown) compatible with the die 74 is used in conjunction with the die 74 in the conventional manner.

In forming a threaded fastener from a headed blank, the blank is placed between a die of the construction shown in FIGURES 8 and 9 and a second die with a recess in place of the blade, as described. One die is reciprocated relative to the other with the headed blank between the two working surfaces so as to first roll a thread in the conventional manner and then roll a groove in the thread at a desired axial location along the axis of the shank of the fastener.

It will be understood from the above description of preferred embodiments of this invention that many advantages are attained from this construction. The present fastener provides an integral self-locking feature which eliminates the need for lock washers or lock nuts. A groove as described above can be applied to existing threads to form a locking band, permitting small orders to be filled from stock fasteners, or the groove can be formed initially along with the thread for large orders and eliminate the need for a dual forming operation. Where plated stock fasteners are to be modified, it is not necessary to strip the plating from the part before forming the groove. As already mentioned, the position of the groove can be varied to suit particular needs. In addition, plural grooves can be provided along the shank of a fastener if desired. The locking or interference torque required to thread a fastener and mating part together can be adjusted by varying the depth and, hence, the width of the groove. Only a small portion of the thread need be of a special construction rather than the complete thread to provide the locking feature. As a result, the area of interference can be localized.

The groove or locking band as disclosed herein provides a uniform decline of interference between the threaded fastener and a mating part during at least five re-uses of the fastener, and the fastener must be tool driven in both directions during the five assembling and disassemblying cycles.

Fasteners embodying the present invention are relatively inexpensive compared to inserted pellet or strip-lock fasteners that utilize a nylon or plastic insert, or as compared with the high root and outside diameter intereference screws. At the same time, the present fastener can be used as an adjustment screw just as can the more expensive inserted pellet or strip-lock fasteners. As will also be apparent from the detailed description, the groove can be formed with conventional equipment using modified dies that can be inexpensively obtained or fabricated.

From the foregoing description of the preferred embodiments of the invention, it will be apparent that the objects heretofore enumerated and others have been accomplished and that there has been provided an inexpensive, simple lock fastener which can be formed initially or from an already threaded stock fastener, which can be easily and inexpensively produced, and which can be re-used if desired.

While the preferred embodiments have been described in detail, the invention is not limited to the particular construction referred to and it is the intention to hereby cover all adaptations, modifications and practices within the scope of the invention. For example, where different degrees of interference are desired, the width, depth and contour of the surface of the groove that produces the interference action can be varied. For example, it is contemplated that the width of the groove can extend an axial distance along the shank that might vary in different fasteners. The depth of the groove, while preferably being no greater than the thread depth, can be considerably less. In addition, the band can be helical, rather than circular, but extending about the shank at an angle different from the lead angle of the thread. Other variations within the scope of the appended claims will be apparent to those skilled in the art.

What is claimed is:

1. In a self-locking threaded fastener having an integral head and shank with an external, standard screw thread formed in at least a portion of the shank: a V-shaped circular groove formed in the shank interrupting the screw thread intermediate the ends thereof and deforming the adjacent thread convolutions for producing interference with a mating part to the screw thread, the centerline of said groove lying in a plane perpendicular to the axis of the shank, said groove having a depth essentially no greater than the depth of the screw thread and having a width greater than the lead of the screw thread, and having sloping side surfaces defining the side walls thereof that diverge radially outwardly; and circumferential end surface portions at axially outward sides of the walls of the groove, which extend from the shank in axially opposite directions at angles smaller than the flank angle of the thread a distance radially of the shank about equal to that of the thread crest so as to form circumferential abutments at opposite axial ends of the groove which exert forces outwardly in opposite axial directions against adjacent thread portions of an internally threaded mating member, which mating member is otherwise adapted to thread with said external thread with a noninterference fit.

2. In a self-locking threaded fastener: a member comprising an integral head and shank and an external, standard, screw thread formed in at least a portion of the shank; a rolled circular groove in the shank of said member intermediate the ends of said thread for producing interference with a mating part to the screw thread, said groove having a depth essentially no greater than the depth of the screw thread and having sloping side surface portions that diverge outwardly; and circumferential surface portions in the shank of said member at axially outward sides of the groove, which extend relative to the axis of the thread at angles smaller than the flank angle of the thread and a distance radially of the shank about equal to that of the thread crest so as to form circumferential abutments at opposite axial ends of the groove which exert forces outwardly in opposite axial directions against adjacent thread portions of an internally threaded mating member which is otherwise adapted to thread with said external thread with a noninterference fit.

3. In a self-locking threaded fastener: a member comprising an integral head and shank and an external, standard, screw thread formed in at least a portion of the shank; a circular groove formed in the shank of said member intermediate the ends of said thread and deforming a thread convolution for producing interference with a mating part to the screw thread, the centerline of said groove lying in a plane perpendicular to the axis of the shank, said groove having a depth essentially no greater than the depth of the screw thread and having sloping side surfaces defining side wall portions thereof that diverge radially outwardly; and circumferential surface portions in the shank at axially outward sides of the groove, which extend relative to the axis of the thread at angles smaller than the flank angle of the thread and a distance radially of the shank about equal to that of the thread crest so as to form circumferential abutments that act in opposite axial directions against adjacent thread portions of an internally threaded mating member which is otherwise adapted to thread with said external thread with a noninterference fit.

References Cited

UNITED STATES PATENTS

| 1,626,863 | 5/1927 | Nacey. | |
| 2,349,593 | 5/1944 | Hasking | 151—22 |

FOREIGN PATENTS 555,123  8/1943  Great Britain.

RAMON S. BRITTS, Primary Examiner

U.S. Cl. X.R.

10—10